Sept. 6, 1960  A. F. SMITH ET AL  2,951,395
FLEXIBLE GEARBOX MOUNTING
Filed Sept. 17, 1958  2 Sheets-Sheet 2
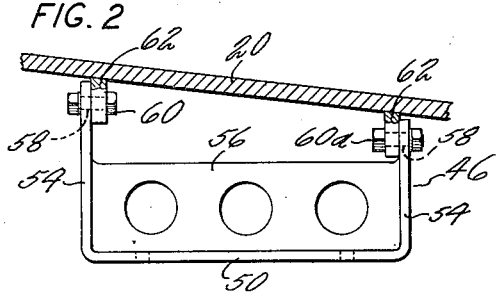
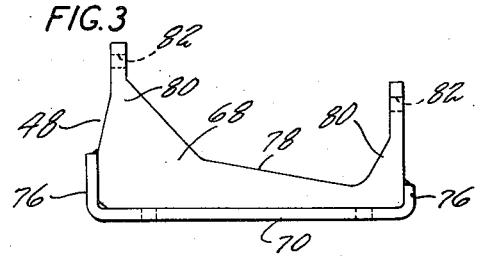
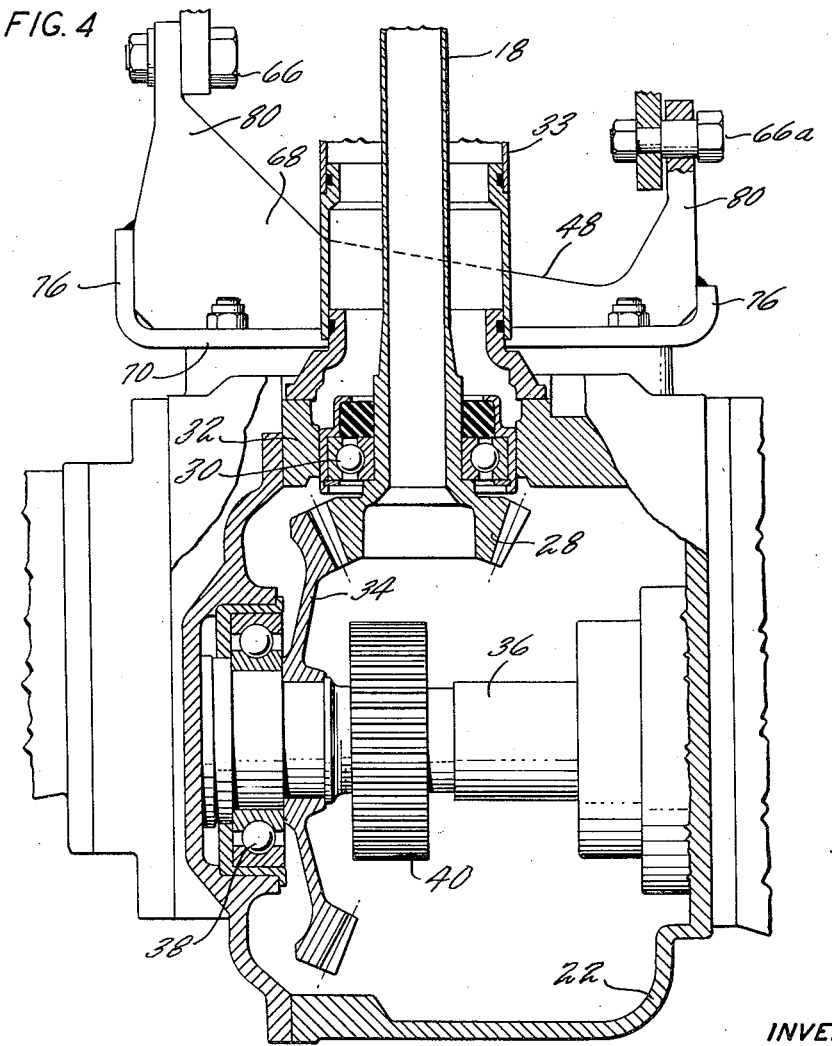
INVENTORS
ALEXANDER KURTI
ALDEN F. SMITH
BY Charles A. Warren
ATTORNEY United States Patent Office 2,951,395
Patented Sept. 6, 1960

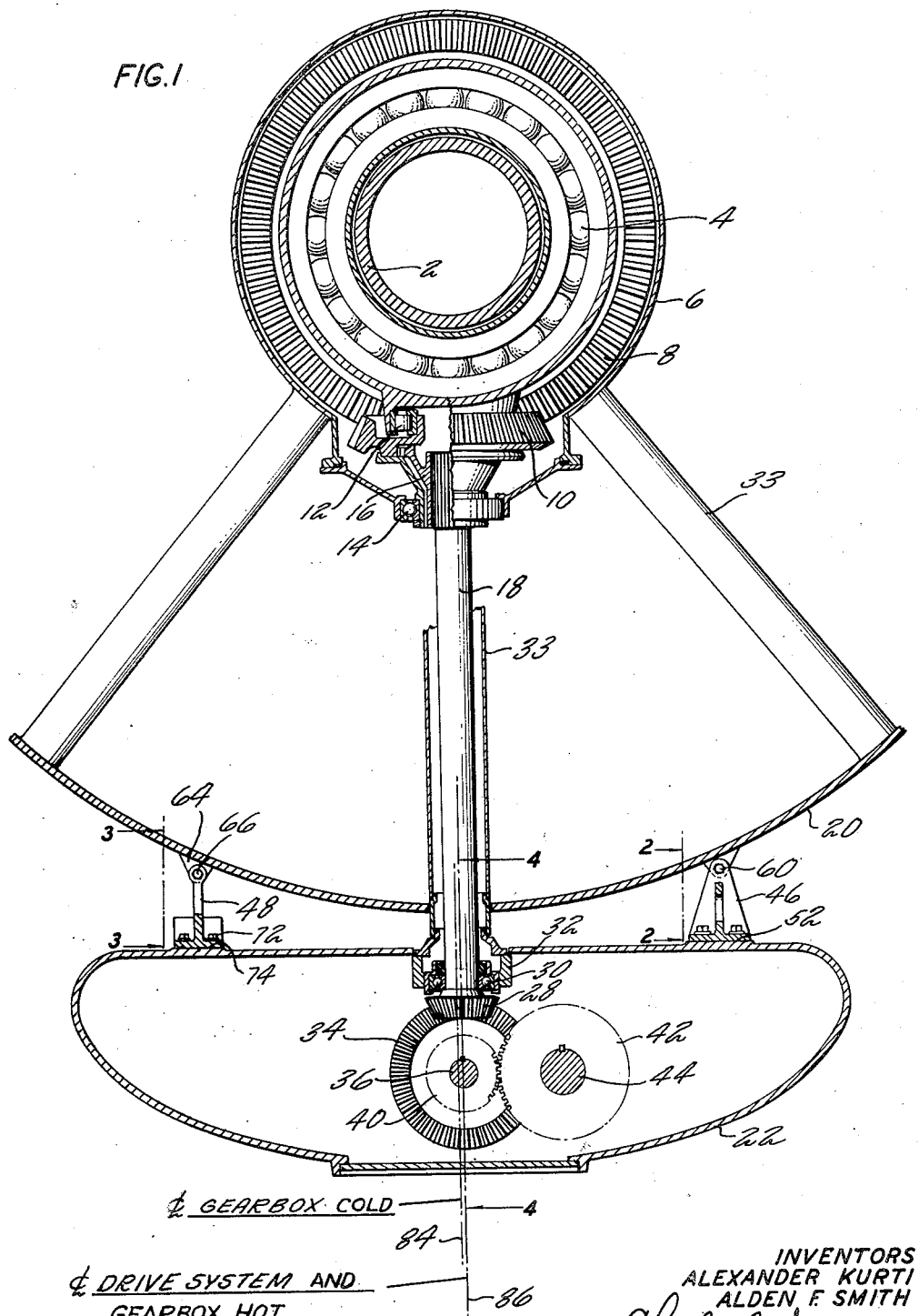

2,951,395

FLEXIBLE GEARBOX MOUNTING

Alden F. Smith, Glastonbury, and Alexander Kurti, North Woodbury, Conn., assignors to United Aircraft Corporation, East Hartford, Conn., a corporation of Delaware Filed Sept. 17, 1958, Ser. No. 764,209

11 Claims. (Cl. 74—606)

In gas turbine engines especially those used in aircraft the accessories are frequently mounted as a unit on a gearbox which in turn is attached to the outside of the engine casing. These accessories are driven from the engine shaft through a radially extending shaft journaled in the bearing in the casing and in the gearbox. Such a drive shaft regularly has a spline connection to permit removal of the gearbox with the accessories thereon as a unit.

One problem in this arrangement has been the maintenance of the alignment of the shaft bearings in the engine casing and in the gearbox particularly because of the relative thermal expansions of the various parts of the engine as they become heated during engine operation. This is especially true when the accessories are driven from a point adjacent to the combustion chamber and the gearbox would accordingly be located near to the hottest part of the engine case. One feature of the invention is to isolate the accessory box or gearbox from the casing by mounting brackets which permit the gearbox to operate at relatively cool temperatures but which at the same time assure alignment of the shaft bearings during normal engine operation.

This problem of compensating for the relative thermal expansions for the various parts of the engine becomes increasingly serious when the engine is installed in an aircraft operating at high Mach numbers since under these conditions the ram air both for the engine itself and for the flow in the nacelle around the engine for cooling is at a comparatively high temperature such that no extensive cooling of the engine is possible. One feature of the invention is the arrangement of the gearbox mounting so that the shaft alignment will be maintained at these abnormally high temperatures.

If the accessory case or gearbox is attached directly to the engine casing the gearbox becomes heated directly from the engine case such that the accessories and the driving gearing within the gearbox become too hot to operate effectively. Another feature of the invention is an arrangement for mounting the gearbox such that it will be spaced from the engine case but the desired bearing alignment will be maintained while the engine is operating normally.

Other features and advantages will be apparent from the specification and claims, and from the accompanying drawings which illustrate an embodiment of the invention.

Fig. 1 is a diagrammatic sectional view taken in a plane at right angles to the main driving shaft of a powerplant to show the accessory drive.

Fig. 2 is a sectional view along the line 2—2 of Fig. 1.

Fig. 3 is a sectional view along the line 3—3 of Fig. 1.

Fig. 4 is a sectional view substantially along the line 4—4 of Fig. 1.

The drive between the main shaft for the engine and the accessory shaft is, in general, similar to the arrangement shown, for example in the Savin Patent No. 2,747,367. For the purpose of this invention, the engine shaft 2 is shown as supported by antifriction bearings 4 within a housing 6 and has mounted thereon a gear 8 which is in mesh with a gear 10 journaled in spaced bearings 12 and 14 mounted in a part of the housing 6. The bearings 12 and 14 support the gear 10 both axially and radially such that driving engagement is maintained with the gear 8, the latter being splined or otherwise mounted on the shaft 2 to rotate therewith.

The hub 16 of the gear 10 is splined to receive the splined end of the accessory drive shaft 18 which extends substantially radially outward from the main shaft 2 through the outer casing 20 of the engine and into the gearbox 22. The outer end of the shaft 18 carries a bevel gear 28 journaled in bearing 30 in a support 32 secured to the gearbox. The outer casing 20 supports housing 6 as by a number of radially extending streamlined struts 33, only three of which are shown.

The bevel gear 28 is in mesh with a cooperating gear 34 mounted on a substantially horizontal shaft 36 journaled within spaced bearings, one bearing 38 of which is shown. The shaft 36 may carry additional gears such as the pinion gear 40 meshing with cooperating gears such as the gear 42 on a shaft 44. The gearbox will carry mounting pads externally of the box to which the accessories may be attached to be driven by the shafts 36 and 44 or by additional shafts which may be provided.

The casing 20 for strength reasons is generally made of steel or titanium which has a relatively low thermal expansion and the gearbox 22 is frequenly made of aluminum or magnesium for weight reasons and this material has a relatively high rate of thermal expansion. Furthermore, the casing 20 during engine operation will become considerably hotter than the gearbox and if the gearbox were bolted directly to the casing severe thermal stresses would be caused. To avoid this, the gearbox is flexibly supported from the engine casing by a pair of circumferentially spaced brackets 46 and 48, the bracket 46 being a rigid bracket and the bracket 48 being flexible to permit relative expansion between the gearbox and the casing.

The bracket 46 includes a base plate 50 which is bolted to a mounting pad 52 on the gearbox and has upstanding end braces 54 rigidly connected together by a vertical web 56. The upper ends of the braces 54 have openings 58 to receive bolts 60 and 60a by which the bracket is bolted to axially spaced projecting lugs 62 on the casing 20. This bracket locates the mounting pad 52 on the gearbox in fixed relation to the casing 20 by reason of the rigidity in a circumferential direction of the end braces 54.

The bracket 48 is held to the casing 20 by lugs 64 on the casing similar to lugs 62, the lugs 64 being connected to bracket 48 as by bolts 66 and 66a. This bracket 48, however, is built to incorporate flexibility in a circumferential direction, that is to say, in a plane substantially at right angles to the axis of the engine. To this end, the main supporting structure is a web 68 attached at its lower edge to the base 70 attached as by bolts 72 to a mounting pad 74. Relatively short upstanding end braces 76 provide for a secure attachment for the web 68 to the base. Above the upper edge of the braces 76 the web 68 has a deep central notch 78 defining spaced upstanding fingers 80 in the upper ends of which are the openings 82 for receiving the bolts 66. These fingers are flexible in a direction substantially in or parallel to a plane at right angles to the axis of the engine and thus these fingers permit lateral movement of the portion of the gearbox adjacent to mounting pad 74 with respect to the casing 20.

In attachment of the gearbox to the engine, the location of the mounting pads 52 and 74 and attached brackets is such that when the engine casing and gearbox are cold the vertical center line of the gear 28 will be offset with respect to the center line of the gear 10 at the other end of the drive shaft 18. The misalignment of the two gears is in such a direction and has such a magnitude that when the engine and gearbox reach the normal engine operating temperature the relative thermal expansion will cause a movement between the axes of the two gears such that the axes will move into alignment.

In the arrangement shown, the dot-dash line 86 represents the center line of the drive system when the gas turbine is at the temperature for normal operation at which time the center line of the gear 28 and the gear 34 are in precise alignment with the axis of the bevel gear 10. In order that this condition may prevail, it is essential in locating the brackets 46 and 48 that the center lines of the pair of gears 28 and 34 and therefore the center line of the shaft 36 be offset when cold from the center line of the drive system. Accordingly, as shown, the center line of gears 28 and 34, when cold, is represented by the dot-dash line 84 which also represents the center line of the gearbox when cold. This center line is offset to the left, Fig. 1, of the center line of the drive system when hot, as shown. It will be understood that the line 86 represents the center line of gear 10 when cold. When considering the relative expansion of the parts it is assumed that the axis of shaft 2 and the vertical axis of gear 10 remains fixed.

As the casings 20 and 22 expand, the thermal expansion of the casing 20 between bolts 60 and 66 will be greater than the thermal expansion of the casing 22 between the brackets 46 and 48 because of the higher temperature reached by the casing 20. Thus the center line of the gearbox will be shifted to the right into alignment with the vertical center line 86. As a practical matter, the relative expansions of the gearbox and the casing 20 will also be affected by the materials of these parts and this must also be compensated for. It will be obvious that by knowing the temperatures of the gearbox and of the casing 20 at normal operating conditions, it will be possible to determine the change in dimensions and thus so locate the bracket 46 that the differential thermal expansion of the parts will result in bringing the center line of the gearbox into precise alignment with the center line of the drive system when the turbine and gearbox are at normal operating temperatures. The flexibility of the bracket 48 permits this relative movement and thereby assures that there will be no misalignment during normal operation. It will be understood that the slight misalignment necessary during starting and warm-up of the engine will not be serious since the spline connection and the flexibility of shaft 18 will provide the necessary flexibility for short term operation.

To compensate for differential thermal expansion in an axial direction one of the attachment bolts for each bracket 46 and 48, preferably both rearward bolts, (or both forward bolts) is arranged to provide a small axial movement with respect to the associated attachment lug 62 or 64. Thus, as shown in detail in Fig. 4, the bolt 60a (and also 66a for bracket 70) has a shoulder 88 spaced from the head 90 a distance greater than the thickness of flange or end brace 54 so that this brace can slide axially thereon. The shoulder 88 is clamped against lug 62 and held by the nut 92. The same offset of the gearbox axis, when cold, is provided as in the arrangement for circumferential compensation, above described.

It is to be understood that the invention is not limited to the specific embodiment herein illustrated and described, but may be used in other ways without departure from its spirit as defined by the following claims.

We claim:

1. In a gas turbine powerplant, a casing, an accessory box mounted externally of the casing, a power shaft journaled within the casing, an accessory drive shaft extending from said power shaft to said box, gearing between said shafts for driving the accessory shaft, said casing having bearings in which the drive shaft is journaled, and means for mounting said box on said casing including circumferentially spaced brackets on the casing attached at spaced points to said box, one of said brackets being substantially rigid and the other being substantially flexible to permit relative expansion between said box and said casing.

2. In a gas turbine powerplant, a casing, an accessory box mounted externally of the casing, a power shaft journaled within the casing, an accessory drive shaft extending from said power shaft to said box, gearing between said shafts for driving the accessory shaft, said casing having bearings in which the drive shaft is journaled, and said gearbox also having a bearing for said accessory shaft, means for mounting said box on said casing including circumferentially spaced brackets on the casing attached at spaced points to said box one of said brackets being substantially rigid and the other being substantially flexible to permit relative expansion between said box and said casing, said brackets being so located that the bearings in the casing are misaligned with the gearbox bearings when the powerplant is cold, the thermal expansion of the gearbox with respect to the casing in operation causing a flexing of the flexible bracket and moving the bearings into alignment.

3. In a gas turbine powerplant, a substantially annular casing, a drive shaft extending substantially radially of said casing, a bearing in said casing supporting said shaft, a gearbox mounted externally on said casing and having a bearing therein supporting the outer end of said shaft, and means for supporting said gearbox on said casing including spaced brackets on said box attached to the casing at circumferentially spaced points, one of said brackets being substantially rigid and the other being flexible to allow differential thermal expansion between the casing and the gearbox.

4. In a gas turbine powerplant, a substantially annular casing, a drive shaft extending substantially radially of said casing, a bearing in said casing supporting said shaft, a gearbox mounted externally on said casing and having a bearing therein supporting the outer end of said shaft, and means for supporting said gearbox on said casing including spaced brackets on said box attached to the casing at circumferentially spaced points, one of said brackets being substantially rigid and the other being flexible to allow differential thermal expansion between the casing and the gearbox, said brackets being substantially equally spaced from the bearing in the gearbox.

5. In a gas turbine powerplant, a substantially annular casing, a drive shaft extending substantially radially of said casing, a bearing in said casing supporting said shaft, a gearbox mounted externally on said casing and having a bearing therein supporting the outer end of said shaft, and means for supporting said gearbox on said casing including spaced brackets on said box attached to the casing at circumferentially spaced points, one of said brackets being substantially rigid and the other being flexible to allow differential thermal expansion between the casing and the gearbox, said brackets being so attached to said casing and bracket that the two bearings are misaligned when the powerplant is cold, the misalignment being such that, when the powerplant is at normal operating temperatures, the relative thermal expansion will place the bearings in alignment.

6. In a gas turbine powerplant, a substantially annular casing, a drive shaft extending substantially radially of said casing, a bearing in said casing supporting said shaft, a gearbox mounted externally on said casing and having a bearing therein supporting the outer end of said shaft, and means for supporting said gearbox on said casing including spaced brackets on said box attached to the casing at circumferentially spaced points, one of said brackets being substantially rigid and the other being flexible to allow differential thermal expansion between the casing and the gearbox, said rigid bracket being so located on the gearbox and casing that, at normal operating temperatures of the powerplant, the bearings will be in alignment, the flexible bracket permitting misalignment of the bearings as the powerplant cools.

7. In a gas turbine engine, a substantially annular casing, a drive shaft extending substantially radially of said casing, a bearing supported within the casing, a gear carried by said bearing, a shaft having a spline engagement with and supported by said gear, a gearbox mounted externally on said casing and having a bearing therein, a gear supported by said bearing, the outer end of said shaft having a spline engagement with and supported by the gear in said gearbox, and means for supporting said gearbox on said casing including spaced brackets on said box attached to the casing at circumferentially spaced points, one of said brackets being substantially rigid and the other being flexible to allow differential thermal expansion between the casing and the gearbox.

8. In a gas turbine engine, a substantially annular casing, a drive shaft extending substantially radially of said casing, a bearing supported within the casing, a gear carried by said bearing, a shaft having a spline engagement with and supported by said gear, a gearbox mounted externally on said casing and having a bearing therein, a gear supported by said bearing, the outer end of said shaft having a spline engagement with and supported by the gear in said gearbox, and means for supporting said gearbox on said casing including spaced brackets on said box attached to the casing at circumferentially spaced points, one of said brackets being substantially rigid and the other being flexible to allow differential thermal expansion between the casing and the gearbox, said brackets being so attached to said casing and bracket that the two bearings are misaligned when the powerplant is cold, the misalignment being such that, when the powerplant is at normal operating temperature, the relative thermal expansion will place the bearings in alignment.

9. In a gas turbine engine, a substantially annular casing, a drive shaft extending substantially radially of said casing, a bearing supported within the casing, a gear carried by said bearing, a shaft having a spline engagement with and supported by said gear, a gearbox mounted externally on said casing and having a bearing therein, a gear supported by said bearing, the outer end of said shaft having a spline engagement with and supported by the gear in said gearbox, and means for supporting said gearbox on said casing including spaced brackets on said box attached to the casing at circumferentially spaced points, one of said brackets being substantially rigid and the other being flexible to allow differential thermal expansion between the casing and the gearbox, said spline connections permitting a misalignment of said bearings when the engine is cold without bending the shaft.

10. In a gas turbine powerplant, a casing, an accessory box mounted externally of the casing, a power shaft journaled within said box in substantially parallel relation with the power shaft, a drive shaft providing a drive connection between said power shaft and said accessory shaft, bearings in said casing and box for said drive shaft, and circumferentially spaced attachment means for mounting said box on said casing at points circumferentially spaced from said drive shaft, one of said attachment means being substantially rigid and the other attachment means being substantially flexible in a plane substantially at right angles to the axis of the power shaft.

11. A gas turbine powerplant as in claim 10 in which the drive shaft has gear connections at opposite ends with the power shaft and accessory shaft respectively.

References Cited in the file of this patent

UNITED STATES PATENTS

| | | |
|---|---|---|
| 1,304,993 | Leonard | May 27, 1919 |
| 2,587,345 | Lombard | Feb. 26, 1952 |